A. B. HENDRYX.

Improvement in Mechanical-Movement.

No. 130,372.  Patented Aug. 13, 1872.

Witnesses:
J. H. Shumway
A. J. Tibbits

Andrew B. Hendryx
Inventor
By Atty.
John S. Earle

UNITED STATES PATENT OFFICE.

ANDREW B. HENDRYX, OF ANSONIA, CONNECTICUT, ASSIGNOR TO HIMSELF AND ALBERT W. WEBSTER, OF SAME PLACE.

IMPROVEMENT IN MECHANICAL MOVEMENTS.

Specification forming part of Letters Patent No. 130,372, dated August 13, 1872.

*To all whom it may concern:*

Be it known that I, ANDREW B. HENDRYX, of Ansonia, in the county of New Haven and State of Connecticut, have invented a new Improvement in Mechanical Movement for Converting Motion; and I do hereby declare the following, when taken in connection with the accompanying drawing and the letters of reference marked thereon, to be a full, clear, and exact description of the same, and which said drawing constitutes part of this specification, and represents, in—

Figure 1:
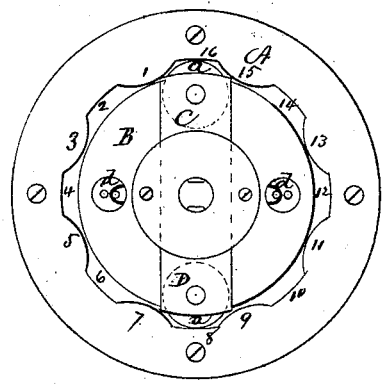
Figure 2:
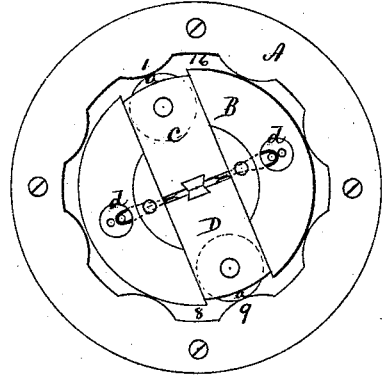

Figure 1 a front view, and in Fig. 2 a front view, the parts in a different position, to illustrate the operation.

This invention relates to an improved method of converting rotary into reciprocating motion, and, for convenience of illustration, is here represented as operating two reciprocating slides. The invention consists in a ring, the internal surface of which is formed in alternate projections and recesses combined with an internal bearing, so that the rotation of the said ring revolving around such bearing will, by the said notches and recesses, impart to the said bearing a reciprocating movement equal to the extreme of the said notches and recesses; or, if the bearing be rotated upon a fixed center, and the ring not rotated, the said bearing will impart a corresponding reciprocation to the said rings.

A is the ring, constructed with projections 1, 3, 5, &c., between which are recesses, 2, 4, 6, &c. Within the said ring is arranged a head, B, which carries two slides, C D, the said slides moving freely in the head on a central line, and thrown outward or apart by springs $d$, or otherwise. To avoid friction these slides are each provided with an anti-friction roll, $a$, in their outer ends.

The ring A being stationary and the head B revolved, the slides are carried around the interior of the ring, the other end of the slides bearing against the inner surface of the ring; consequently, starting from the position in Fig. 1, the ends of the said slides lying in the recesses 16 and 8, they pass on to the next projections 1 and 9, which forces the slides together, as denoted in Fig. 2. Continuing into the next recess, they are again opened, and so on, closing and opening as they are carried around within the ring, receiving a combined rotating and reciprocating movement.

Two slides are shown, but are not essential, as the same reciprocating movement would be imparted to a single slide; and if a positive reciprocating movement is required, an odd number of projections and recesses should be made upon the inside of the ring, so that when one end of the slide was in one recess the opposite end would be upon a projection.

If it is desired to impart a reciprocating movement to the ring or parts in connection therewith, then the bearing or mechanism within the ring should be stationary, and the ring revolving, would receive a like combined rotary and reciprocating movement from which a reciprocating movement only could be taken.

I claim as my invention—

The ring A, constructed upon its inner surface with alternate projections and recesses, combined with a bearing or bearings within the said ring, whereby by the rotation of either the said ring or said bearing a reciprocating movement is imparted to the said stationary part, substantially as described.

A. B. HENDRYX.

Witnesses:
N. S. JOHNSON,
LOCKWOOD HOTCHKISS.